United States Patent [19]
Belz et al.

[11] 3,719,889
[45] March 6, 1973

[54] LASER PULSE TRAIN TOTALIZER AND INTERVAL COUNTER

[75] Inventors: Ronald A. Belz, Henry T. Kalb, both of Manchester; James D. Trolinger, Tullahoma, all of Tenn.

[73] Assignee: The United States of America as represented by Secretary of the Air Force, Washington, D.C.

[22] Filed: Dec. 14, 1971

[21] Appl. No.: 207,754

[52] U.S. Cl. .................................................324/186
[51] Int. Cl. ........G04f 9/00, G04f 11/06, H01j 39/12
[58] Field of Search.............324/181, 186; 250/211 J

[56] References Cited

UNITED STATES PATENTS 3,656,060  4/1972  Bauernfeind et al. ..................324/186

OTHER PUBLICATIONS

D'Asaro et al.; Electronics; May 30, 1966; pp. 94–98.

Primary Examiner—Alfred E. Smith
Attorney—Harry A. Herbert, Jr. et al.

[57] ABSTRACT

Pulses from a laser pulse train are detected and square wave shaped to trigger a first flip-flop in which one complementary output activating one input of a display comprising an array of light emitting diodes while the other output triggers a NOR gate and a second flip-flop, one complementary output thereof feeding a second input of the display with the other complementary output feeding the NOR gate which then feeds back to inhibit the first flip-flop. The square wave also activates a third flip-flop with one cpmplementary output thereof enabling a NOR gate for passing clock pulses which are decade divided and displayed on light emitting diode arrays. The other output of the third flip-flop feeds a pair of cross coupled NOR gates acting as a flip-flop, the output thereof being fed back to inhibit the third flip-flop.

4 Claims, 3 Drawing Figures

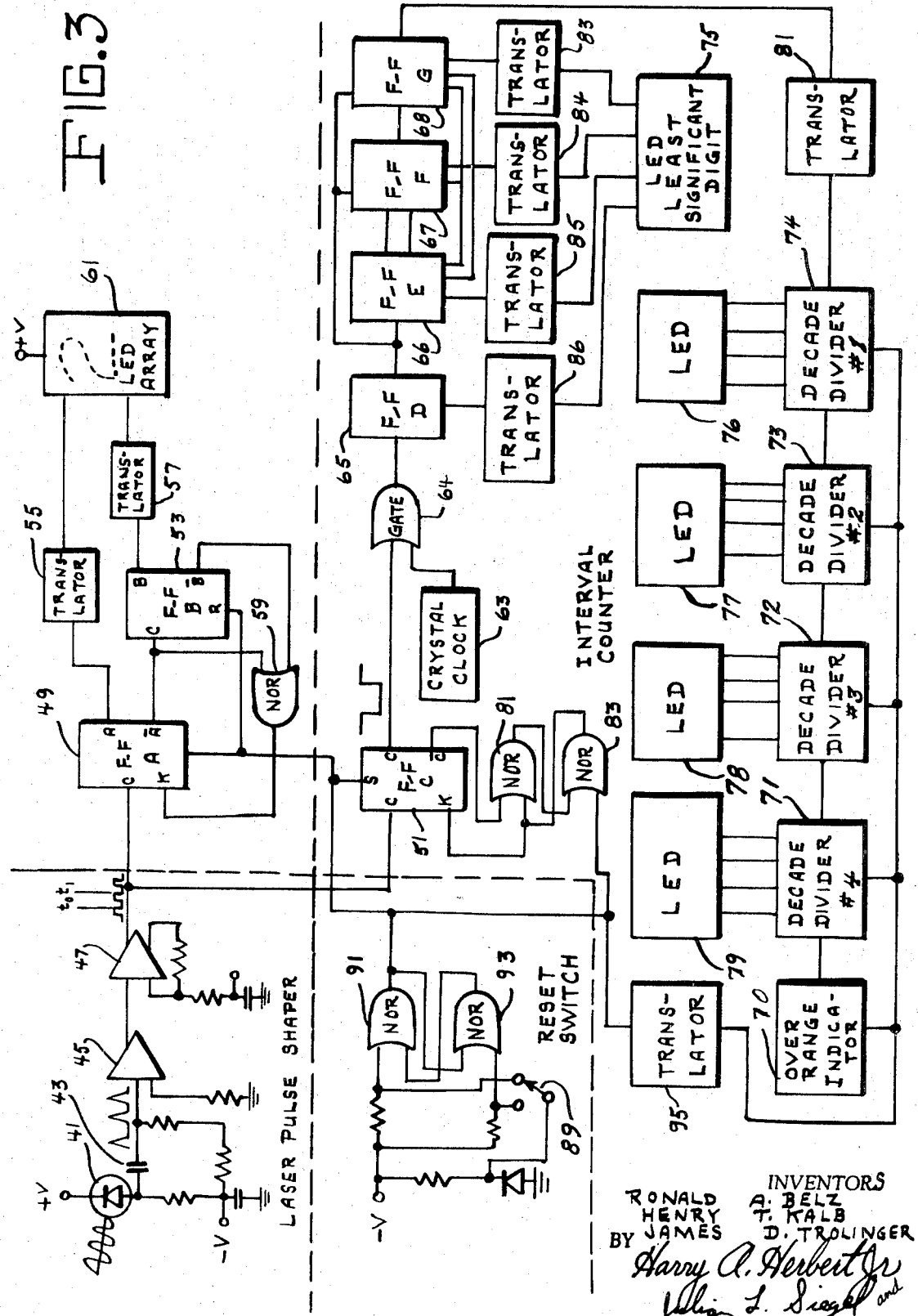

LASER PULSE TRAIN TOTALIZER AND INTERVAL COUNTER

BACKGROUND OF THE INVENTION

This invention relates to systems for analyzing pulse sequences, and more particularly to a device for counting pulses from a laser and determining the interval therebetween.

A double exposure hologram is usually taken by operating a ruby laser in a double pulse mode. Either a passive or an active Q-switch is used to produce double pulses. In both cases the pulse separation at this time can only be found by observing the pulses, or energy waveforms on an oscilloscope. When a passive Q-switch (a dye cell) is used, changes in temperature, dye concentration, and pumping energy can change the number of pulses and their separation. In the event of multiple or single pulsing, the laser parameters must be changed accordingly to obtain the double pulse condition.

In the past, the laser light was detected and the light intensity, or energy, was displayed on a storage oscilloscope. This represents a rather bulky and expensive piece of equipment, which is capable of recording the rapid pulse waveforms only as energy levels and necessitates multiple firings to insure proper oscilloscope triggering and signal presentation.

SUMMARY OF THE INVENTION

The present invention is a system which can be used for the numerical display of the pertinent number of light pulses (0, one, two, or three) from a Q-switched laser and the time interval between the first two. Rapid data acquisition and simplicity of operation make this invention unique in pulsed laser applications especially when double pulsing is necessary for holographic velocimetry data. An internal 100 MHz clock displays the time separation to ± 10 nanoseconds. The system herein described performs a task that formerly required the combined use of a storage oscilloscope, a laser photometer and a high speed frequency counter. The present invention represents an order of magnitude decrease in equipment cost and possesses a degree of portability and ease of operation that can not be equaled by the multi-instrument approach.

It is therefore an object of this invention to provide a novel and improved pulse totalizer and interval counter.

It is another object to provide a pulse totalizer and interval counter for analyzing pulses from a Q-switch laser particularly for double pulsing needed for holographic velocimetric data.

It is still another object to provide a pulse totalizer and interval counter that eliminates the need for an oscilloscope for observing pulse separation.

These and other objects, advantages and features of the invention will become more apparent from the following description taken in connection with the illustrative embodiment in the following drawings.

DESCRIPTION OF THE DRAWINGS

FIG. 3 is a block diagram showing details of that shown in FIG. 2.

DETAILED DESCRIPTION OF THE PREFERRED EMBODIMENT

Figure 1:
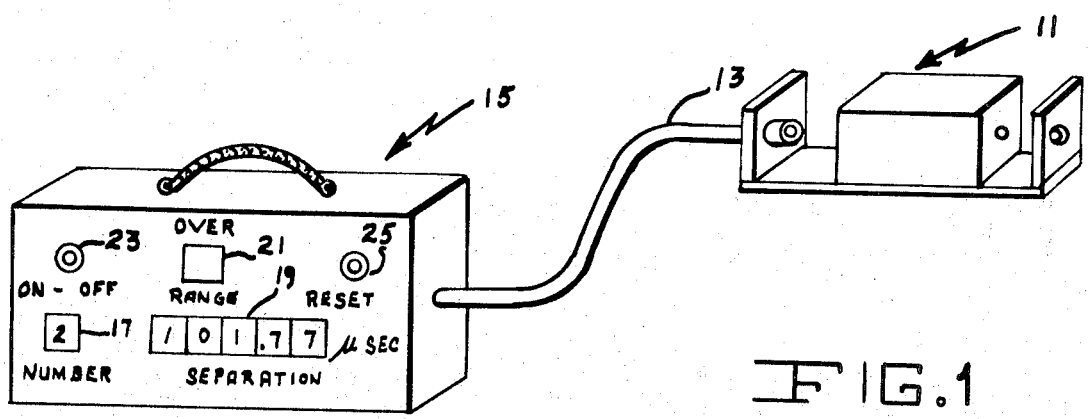
FIG. 1 is a pictorial representation showing an embodiment of the invention.

FIG. 1 shows a pictorial of the system wherein laser 11 produces the pulses which are to be counted and interval measured. The energy of the pulses are carried by fiber optics bundle 13 to totalizer and interval counter 15 although reflected light from an optical element can be detected also. The total number of light pulses are displayed by indicator 17 and the separation between the first two pulses are displayed by indicator 19. This system is especially valuable for double pulsed velocity measurements although it is possible to obtain a general indication of the proper laser firing mode by the pulse number and indication. More than two pulses are indicated on numeric readout 17 as the number 3 and only the time separation between the initial two pulses is displayed. By the use of blocking capacitors, the system is impervious to background light.

Counter 19 in the particular embodiment shown can count an interval up to 999.99 $\mu$sec. If the count goes higher over range light 21 is activated. Power to the system is controlled with switch 23 and the system is reset with switch 25.

Figure 2:
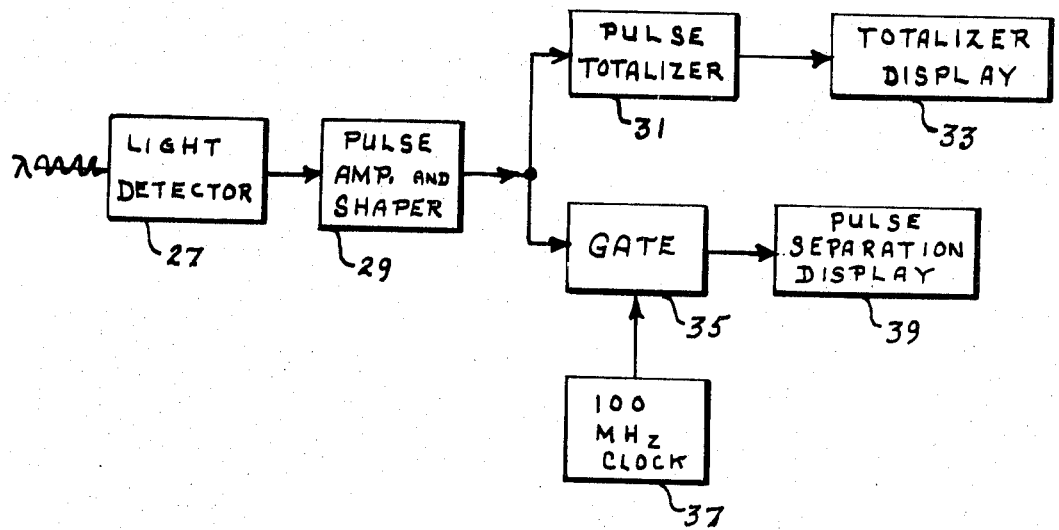
FIG. 2 is a block diagram of an embodiment of the invention.

The basic subsections of the pulse data readout are indicated in block diagram form in FIG. 2. The light from the laser is detected by detector 27 and the resulting electrical signal is amplified and shaped in circuits 29. These conditioned pulses drive the logic circuitry which displays the numerals 0, 1, 2, and 3, depending on the number of light pulses detected. The first two pulses also open and close gate 35 allowing signals from clock 37 to be encoded and the time between the opening and closing of gate 35 appear on display 39. Upon passage of the second pulse, the gate is inhibited from reopening until it is manually reset preventing the separation between other pulses from being displayed. If only a single pulse occurs at the gate, it will remain open until it is manually reset. In this case the numeric display of the pulse separation will remain at zero.

The detection of a 20 nanosecond duration laser light pulses and the accurate determination of the time interval between pulses requires the application of fast pulse techniques in electronic circuits which are illustrated in FIG. 3. The packages which can be employed in this circuit are commercially available integrated circuits and for the most part are high speed emitter coupled logic types. Photo diode 41 with a rise time $t_R$ of less than 1 nanosecond senses the light pulse and introduces a voltage pulse through coupling capacitor 43 into amplifier 45 and then to Schmitt trigger 47 which shapes the input signal for the logic circuits.

Flip-flops A and B (designated as 53), translators 55 and 57, NOR gate 59, and the light emitting diode numeric indicator 61, comprise the pulse totalizer. This circuit counts each light pulse produced by the laser up to three pulses and displays the results on numeric indicator 61. At the third laser pulse A and B both appear at logic "0," i.e., at the low level. NOR gate 59 has an output which is a logic "1" that is fed to the K input of flip-flop 49. The application of this logic state inhibits further toggling of flip-flop 49 which in turn inhibits flip-flop 53. These emitter coupled logic circuits are coupled to translators 55 and 57 to permit voltage level translation from from the emitter coupled logic ECL circuits to transistor-transistor logic TTL which is accepted by light-emitting diode numeric indicator 61. Since only four states need to be recognized, 0 to 3, a two-line coded input to numeric indicator 61 is sufficient. This indicator can be a 5 × 7 matrix or light-emitting diodes containing internal current drivers and a binary coded decimal decoder.

Velocity measurement requires accurate data for the determination of $\Delta t$, which is the time interval between $t_0$ the leading edge of the first pulse and $t_1$, the leading edge of the second pulse. The first two pulses of the input pulse train cause flip-flop 51 to produce a gating pulse to clock gate 64. During the gating pulse interval clock pulses from clock 63, in the example a precision 100 MHz crystal clock oscillator, are allowed to pass through driver 64 and into a series of flip-flops 65–68 which serve as the first decade divider. At the terminal edge of the gating pulse resulting from the second light pulse, numeric indicators 75–79 display the elapsed time between $t_0$ and $t_1$ resolved to 10 nanoseconds. Indicator 75 displays the least significant digit. The maximum time interval that may be recorded is 999.99 microseconds.

Flip-flop 51 initially is preset with the C output at logic "1" which changes to logic "0" at the first laser pulse. The complement terminal $\bar{C}$ likewise goes to "1" causing NOR gates 81 and 83 which are a cross-coupled pair serving as a set-reset flip-flop to return a logic "1" to the K input of flip-flop 51. At the next clock pulse into flip-flop 51 the C terminal will return to logic "1" and no further change in the flip-flop state will occur, i.e., flip-flop 51 is inhibited by the shifted set applied to the K terminal.

If the C terminal of flip-flop 51 is "1," gate 64 is closed to the pulses from clock 63. Thus gate 64 serves as the countermain gate. Special high speed flip-flops are required to count the 100 MHz clock pulse train. The output frequency of the pulse train from the divider is 10 MHz thus permitting further divider packages 71–74 to be of the slow speed TTL type. If over-range occurs divider 71 will activate over-range indicator 70. The commercially available decade divider available as a single 14 pin dual-in-line package can be interfaced directly with the numeric indicator. Data transfer is made by a four line binary coded decimal circuit.

The emitter coupled logic divider 65–68 requires voltage translators 83–86 between indicator 75. A further voltage translator 81 is required of the 10 MHz pulse train entering the transistor-transistor logic divider 74. At the completion of the second laser pulse numeric indicators 75–79 will display the elapsed time interval $t_1 - t_0$.

The numeric indicators are reset to read "0" for subsequent laser firings by depressing the reset button 89. NOR gates 91 and 93 together act as an R-S flip-flop. The increase in voltage at NOR gate 93 changes the state of the output of this R-S flip-flop configuration to a logic level "1" which resets all flip-flops and decade dividers to the desired initial conditions. The transistor 95 interfaces this logic state with all the reset terminals along the TTL decade divers 71–74.

It is claimed:
1. A system for simultaneously counting laser pulses and determining the interval therebetween comprising:
   a. a first totalizer flip-flop fed by the pulses and having first and second complementary outputs;
   b. a second totalizer flip-flop fed by the first complementary output of the first totalizer flip-flop having first and second complementary outputs;
   c. a totalizer NOR gate fed by the first complementary output of the first totalizer flip-flop and the first complementary output of the second totalizer flip-flop, the output of the totalizer NOR gate being fed to the input of the first flip-flop;
   d. a totalizer diode array display fed by the second complementary output of the first totalizer flip-flop and the second complementary output of the second totalizer flip-flop;
   e. a first counter flip-flop fed by the pulses and having first and second complementary outputs;
   f. a clock;
   g. a NOR gate fed by the clock and enabled by the first complementary output of the first counter flip-flop;
   h. a second counter flip-flop fed by the second complementary output of the first counter flip-flop and feeding the input of the first counter flip-flop;
   i. a decade divider having a sequence of stages fed by the NOR gate; and
   j. a diode display fed by the decade divider.

2. A laser counting and interval measuring system according to claim 1 which further comprises an over range indicator fed by the output of the last stage in the sequence of the decade divider.

3. A laser counting and interval measuring system according to claim 2 which further comprises means for resetting the decade divider.

4. A laser counting and interval measuring system according to claim 3 which further comprises:
   a. a diode light detector for sensing the laser pulses; and
   b. a Schmitt trigger interposed between the diode light detector and the first totalizer flip-flop.

* * * * *